(12) United States Patent
Kageyama

(10) Patent No.: US 9,807,247 B2
(45) Date of Patent: Oct. 31, 2017

(54) SYSTEMS AND METHODS FOR SHARING COST OF A VIDEO-ON-DEMAND SUBSCRIPTION WITH ANOTHER SUBSCRIBER

(71) Applicant: Rovi Guides, Inc., Santa Clara, CA (US)

(72) Inventor: Tsuyoshi Kageyama, Tokyo (JP)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 14/976,552

(22) Filed: Dec. 21, 2015

(65) Prior Publication Data

US 2017/0180562 A1     Jun. 22, 2017

(51) Int. Cl.
*H04W 4/24* (2009.01)
*H04M 15/00* (2006.01)

(52) U.S. Cl.
CPC .......... *H04M 15/07* (2013.01); *H04M 15/58* (2013.01); *H04W 4/24* (2013.01)

(58) Field of Classification Search
CPC ........ H04W 4/24; H04M 15/07; H04M 15/58
USPC ........................ 455/405, 406, 407, 408, 409; 379/114.07, 114.22, 100.03, 100.05, 111, 379/112.01, 112.06, 112.08, 126
See application file for complete search history.

(56) References Cited

U.S. PATENT DOCUMENTS

| | | | |
|---|---|---|---|
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 | 6/2004 | Ward, III et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 2002/0174430 A1 | 11/2002 | Ellis et al. | |
| 2003/0110499 A1 | 6/2003 | Knudson et al. | |
| 2005/0251827 A1 | 11/2005 | Ellis et al. | |
| 2009/0313546 A1* | 12/2009 | Katpelly | H04N 7/17318 715/723 |
| 2010/0153885 A1 | 6/2010 | Yates | |
| 2011/0078714 A1 | 3/2011 | Sagayaraj et al. | |
| 2011/0277008 A1 | 11/2011 | Smith | |
| 2013/0067515 A1 | 3/2013 | Barish | |
| 2013/0219443 A1* | 8/2013 | Argyropoulos | H04N 17/00 725/109 |
| 2013/0297385 A1 | 11/2013 | Mehta et al. | |
| 2014/0366047 A1* | 12/2014 | Thomas | H04N 21/47211 725/5 |

(Continued)

*Primary Examiner* — Inder Mehra

(74) *Attorney, Agent, or Firm* — Haley Guiliano LLP

(57) ABSTRACT

Systems and methods are provided herein for sharing cost of a video subscription of a primary subscriber with a secondary subscriber. These systems and methods provide the secondary subscriber with access to the primary subscriber's video subscription and track a variety of metrics pertaining to access of the video subscription by each subscriber. These systems and methods determine, based on the access metrics, the relative usage of the video subscription by each subscriber and split the total cost of the subscription among them accordingly. This cost sharing subscription model may overcome inefficiencies in cost allocation in current subscription cost models and enable video streaming providers to increase their subscriber satisfaction levels and new subscriber acquisition rates.

20 Claims, 8 Drawing Sheets

(56) References Cited

U.S. PATENT DOCUMENTS

2015/0046301 A1* 2/2015 Wuerch .................. G06Q 40/12
705/30
2017/0142457 A1* 5/2017 Whitton ........... H04N 21/23424

* cited by examiner

SYSTEMS AND METHODS FOR SHARING COST OF A VIDEO-ON-DEMAND SUBSCRIPTION WITH ANOTHER SUBSCRIBER

BACKGROUND OF THE INVENTION

Subscription models of video streaming providers (e.g., Netflix, Amazon Instant, Hulu, etc.) require payments to be made from one single subscriber. This has detrimental effects on their subscriber satisfaction levels and new subscriber acquisition rates. Many subscribers of the video subscriptions are unsatisfied because they feel they are overpaying for a service that they may be underutilizing for a variety of reasons. There exists a subset of non-subscribers who would like to use the video subscription, but not at the offered price point. Thus, while there are sufficient video subscription resources to fulfill the viewing requirements of both the subscriber and the subset of non-subscribers described, there is inefficient cost allocation that results in overall underutilization.

SUMMARY

Systems and methods are provided herein for sharing cost of a video subscription of a primary subscriber with a secondary subscriber. These systems and methods provide the secondary subscriber with access to the primary subscriber's video subscription and track a variety of metrics pertaining to access of the video subscription by each subscriber. These systems and methods determine, based on the access metrics, the relative usage of the video subscription by each subscriber and split the total cost of the subscription among them accordingly.

In some aspects of the disclosure, control circuitry may receive a request from a secondary subscriber to share access to a primary subscriber's video subscription. For example, control circuitry may detect that the secondary subscriber has selected some variant of a "share subscription" option on an interactive user interface. For example, control circuitry may detect that the secondary subscriber has responded to a "Would you like to share access to Subscriber X's video subscription?" prompt on a user interface by selecting the "yes" option.

In some embodiments, control circuitry may, in response to receiving the request, provide the secondary subscriber with access to the primary subscriber's video subscription. For example, control circuitry may allow the secondary subscriber to log in to the primary subscriber's account for a video consumption application (e.g., primary subscriber's Netflix account). The control circuitry may generate for display various video asset identifiers, such as text listings or graphical listings, so that the secondary subscriber can browse the videos offered by the subscription service and play videos associated with the listings. For example, control circuitry may provide the secondary subscriber with access to the primary subscriber's Netflix account. Control circuitry may generate for display a Netflix user interface with some subset of video asset identifiers of videos included in the primary subscriber's Netflix subscription so that the secondary subscriber can browse video asset identifiers and select desired ones for playback.

In some embodiments, control circuitry may monitor access of the primary subscriber's video subscription by the primary subscriber and by the secondary subscriber. For example, control circuitry may determine which subscriber is accessing the video subscription based on log-in credentials. Control circuitry may monitor various parameters indicative of access to the video subscription such as time spent browsing the subscription, time spent viewing videos, number of videos viewed, etc.

In some embodiments, control circuitry may update, based on the monitoring, a plurality of metrics corresponding to the access of the video subscription by the primary subscriber and by the secondary subscriber. For example, the control circuitry may receive an indicia (e.g., a data package containing subscriber ID, ID of video watched and for how long, etc.) that indicates that the primary subscriber has viewed a particular video for ten minutes. In response, control circuitry may access a data structure that stores information about the primary subscriber's access to the video subscription and cause values of certain metrics to be incremented. In this example, control circuitry may instruct storage circuitry or a database to increment the value corresponding to the "number of videos viewed" metric by one, and may instruct storage circuitry or a database to increment the value corresponding to the "time spent viewing videos" metric by ten minutes.

In some embodiments, control circuitry may determine, based on a metric of the plurality of metrics corresponding to the access of the video subscription by the primary subscriber and the secondary subscriber, a first relative usage of the video subscription by the primary subscriber and a second relative usage of the video subscription by the secondary subscriber. For example, control circuitry may use the "time spent browsing the subscription" metric to determine relative usage. In order to do so, control circuitry may access a data structure that stores information about the primary subscriber's access to the video subscription to retrieve a value for the time the primary subscriber spent browsing the video subscription. Similarly, control circuitry may access another data structure that stores information about the secondary subscriber's access to the video subscription to retrieve a value for the time the secondary subscriber spent browsing the video subscription.

To determine the first relative usage and the second relative usage, control circuitry may calculate, based on the values retrieved from the data structures, what percentage of the total time spent browsing the video subscription was due to the primary subscriber and what percentage was due to the secondary subscriber. Control circuitry may then attribute these percentages to the first and second relative usages respectively. As a matter of example, if the time that the primary subscriber spent browsing the video subscription constitutes sixty percent of the total browsing time for the video subscription, then control circuitry determines the first relative usage to be sixty percent as well. Similarly, control circuitry determines the second relative usage to be forty percent.

In some embodiments, control circuitry may calculate, based on the first relative usage of the video subscription, a first cost of sharing the video subscription, where the first cost is to be attributed to the primary subscriber. Following from the determining relative usage example, control circuitry may calculate, based on the primary subscriber's relative usage of sixty percent, the primary subscriber's cost to be sixty percent of the total cost of the video subscription.

In some embodiments, control circuitry may calculate, based on the second relative usage of the video subscription, a second cost of sharing the video subscription, where the second cost is to be attributed to the secondary subscriber. Following from the determining relative usage example, control circuitry may calculate, based on the secondary subscriber's relative usage of forty percent, the secondary subscriber's cost to be forty percent of the total cost of the video subscription.

In some embodiments, control circuitry may identify a subset of videos to which the secondary subscriber will not have access, where the subset is based on at least one of: popularity of each video of the subset, release date of each video of the subset, number of play-backs allowed for each video of the subset, and a source of each video of the subset. For example, control circuitry may identify that the secondary subscriber is not allowed access to videos from a certain source (e.g., proprietary videos of a video consumption application such as Netflix Originals). As a matter of example, control circuitry may identify that the secondary subscriber will not have access to Netflix Originals such as "House of Cards" and "Orange is the New Black."

In some embodiments, control circuitry may receive a request from the primary subscriber to share access to the video subscription. For example, control circuitry may detect that the primary subscriber has selected some variant of a "share subscription" option on an interactive user interface. As a matter of example, control circuitry may detect that the primary subscriber has responded to a "Would you like to share access to your video subscription?" prompt on a user interface by selecting the "yes" option.

In response to receiving the request from the primary subscriber to share access to the video subscription, control circuitry may determine whether the primary subscriber is eligible to share access by comparing the access of the video subscription by the primary subscriber for a previous pre-determined period of time to a threshold. For example, in response to detecting that the primary subscriber has requested to share access to his/her video subscription, control circuitry may access a data structure that stores information about the primary subscriber's access to the video subscription to determine the number of videos the primary subscriber has viewed in the previous month. Control circuitry may then access another database to determine the maximum number of the videos that the primary subscriber is allowed to view in order to be eligible to share access to his/her video subscription. If the number of videos viewed by the primary subscriber is less than the maximum number allowed, control circuitry may determine that the primary subscriber is eligible to share access to the video subscription.

In some embodiments, if control circuitry determines that the primary subscriber is eligible to share access to the video subscription, control circuitry may update an entry in a database to indicate that the video subscription is available for sharing. For example, upon determining that the primary subscriber is eligible to share access to his/her video subscription, control circuitry may access a database that stores information about the primary subscriber's account for the video consumption application (e.g., a database that stores information about the primary subscriber's Netflix account). Control circuitry may then instruct storage circuitry or the database to update an entry in the database to indicate that the video subscription is available for sharing. As a matter of example, control circuitry may instruct the entry corresponding to the "Share subscription" option in the database be updated to "yes."

In some embodiments, control circuitry may, upon receiving a request from the primary subscriber to share the video subscription, generate for display a plurality of selectable options corresponding to the plurality of metrics and receive from the primary subscriber a selection of a selectable option of the plurality of selectable options, where the determining of the first relative usage and the second relative usage is based on a metric of the plurality of metrics that corresponds to the selectable option. For example, control circuitry may generate for display a user interface that requests the primary subscriber to select metric(s) to be used for splitting the cost of the video subscription. As a matter of example, control circuitry may generate selectable options such as "time spent browsing the subscription," "time spent viewing videos," "number of videos viewed," etc. The primary subscriber can select one or more of the displayed options by checking a box or clicking a button on the user interface. For example, when the primary subscriber selects only the "time spent browsing the subscription" option, control circuitry receives this selection and determines each subscriber's relative usage of the video subscription is to be based on the time he/she spent browsing the video subscription.

In some embodiments, control circuitry may determine that a predetermined period of time has elapsed from a time that the monitoring commenced. For example, monitoring periodicity could be monthly, starting on the first day of a month and ending on the last day of the month. Control circuitry may determine that a month has passed by regularly retrieving the current date and time from a database and detecting it is past midnight on the last day of a month.

In some embodiments, if control circuitry determines that the pre-determined period of time has elapsed from the time that the monitoring commenced, control circuitry may initialize each metric of the plurality of metrics to a base value that preceded the updating. For example, following from the example, upon determining a month has passed, control circuitry may access a data structure that stores information about the primary subscriber's access to the video subscription and may instruct storage circuitry or the database to set the values of metrics such as "time spent browsing the subscription," "time spent viewing videos," "number of videos viewed," etc. to zero. Similarly, control circuitry may initialize the value of each access metric in a data structure that stores information about the secondary subscriber's access to the video subscription.

In some embodiments, control circuitry may monitor the access of the video subscription by the primary subscriber and/or by the secondary subscriber by monitoring for the primary subscriber and the secondary subscriber at least one of: time spent browsing the video subscription service, time spent playing back a video in the video subscription service, amount of videos in the video subscription service played back. For example, control circuitry may monitor each subscriber's access of the video subscription by monitoring the time each subscriber spends browsing the video subscription. For example, control circuitry may compare log-in credentials to those saved in a database to determine which subscriber is accessing the video subscription. Control circuitry may then use log-in time, idling time while logged in and log-out times to determine the time spent browsing the video subscription service.

Control circuitry may update, based on the monitoring, the plurality of metrics corresponding to the access of the video subscription by the primary subscriber by storing the plurality of metrics corresponding to the access of the video subscription by the primary subscriber in a first data structure corresponding to the primary subscriber in a database. Similarly, control circuitry may update the plurality of metrics corresponding to the access of the video subscription by the secondary subscriber by storing the plurality of metrics corresponding to the access of the video subscription by the secondary subscriber in a second data structure corresponding to the secondary subscriber in the database. For example, following from the example above, control circuitry may access a database that stores information about the primary subscriber's account for the video consumption application. In the database, control circuitry may store the time that the primary subscriber spent browsing the video subscription in a data structure that stores information about the primary subscriber's access to the video subscription. Similarly, in the database, control circuitry may store the time that the secondary subscriber spent browsing the video subscription in a data structure that stores information about the secondary subscriber's access to the video subscription.

In some embodiments, control circuitry may select, for a pre-determined period of time, the metric of the plurality of metrics corresponding to the access of the video subscription by the primary subscriber and the secondary subscriber. Control circuitry may, based on the metric selected, determine the first relative usage of the video subscription by the primary subscriber and the second relative usage of the video subscription by the secondary subscriber. For example, a pre-determined period of time could be a month. For the first month, control circuitry may select a default metric (e.g., "time spent browsing the video subscription" metric) for determining the relative usage of the video subscription by each subscriber. Sometime during the first month, the primary subscriber may indicate that he/she wants relative usage to be determined based on the "number of videos viewed" metric instead. In response, control circuitry may select "number of videos viewed" to be the metric for determining the relative usage of the video subscription by each subscriber for the next month.

In some embodiments, for determining the relative usage of the video subscription based on the selected metric for a pre-determined period of time, control circuitry may access the first data structure to retrieve a first value of the metric corresponding to the access of the video subscription by the primary subscriber for the pre-determined period of time. For example, following from the example above, control circuitry may access the data structure that stores information about the primary subscriber's access to the video subscription to retrieve the value for the "time spent browsing the video subscription" metric. As a matter of example, the value for the time the primary subscriber spent browsing the video subscription may be 30 hours.

In some embodiments, for determining the relative usage of the video subscription based on the selected metric for a pre-determined period of time, control circuitry may access the second data structure to retrieve a second value of the metric corresponding to the access of the video subscription by the secondary subscriber for the pre-determined period of time. For example, following from the example above, control circuitry may access the data structure that stores information about the secondary subscriber's access to the video subscription to retrieve the value for the "time spent browsing the video subscription" metric. As a matter of example, the value for the time the secondary subscriber spent browsing the video subscription may be 20 hours.

In some embodiments, for determining the relative usage of the video subscription based on the selected metric for a pre-determined period of time, control circuitry, after retrieving the values corresponding to the metric, may compare the first value to the second value. Control circuitry may compute the first relative usage and the second relative usage of the video subscription based on the comparing. For example, following from the example above, control circuitry may determine that the primary subscriber spent 1.5 times more time than the secondary subscriber browsing the video subscription. Based on that, the control circuitry may compute the primary subscriber's relative usage to be sixty percent and the secondary subscriber's relative usage to be forty percent.

In some embodiments, control circuitry may determine that the pre-determined period of time corresponds to a billing cycle, and calculating the cost for the primary subscriber and the secondary subscriber recurs periodically based on the billing cycle. For example, if the billing cycle is monthly starting on the $1^{st}$ of each month, then control circuitry may initialize the values of the metrics corresponding to the primary subscriber's and the secondary subscriber's access of the video subscription on the $1^{st}$ of each month. Control circuitry may also select the metric to be used for determining relative usage of the video subscription by each subscriber on the $1^{st}$ of each month as well.

In some embodiments, control circuitry may calculate the first cost and the second cost of sharing the video subscription by dividing a total cost of the video subscription between the first cost and the second cost such that the first cost is proportional to the first relative usage and the second cost is proportional second relative usage. For example, control circuitry may determine the primary subscriber's relative usage to be sixty percent and the secondary subscriber's relative usage to be forty percent. The total cost of subscription for the billing period is $10, for example. In this case, control circuitry may calculate the primary subscriber's cost to be $6 and the secondary subscriber's cost to be $4.

In some embodiments, after calculating the first and the second cost, control circuitry may determine whether the second cost exceeds a threshold cost. For example, the secondary subscriber may not be provided access to all the videos included with the primary subscriber's video subscription. Because the secondary subscriber receives a lower tier service than the primary subscriber, the cost to the secondary subscriber is capped at the threshold value.

Upon determining that the second cost exceeds the threshold cost, control circuitry may determine additional amount by which the second cost exceeds the threshold cost. Control circuitry may then assign the second cost to be a value that is at least one of: the threshold cost plus some margin where the margin does not exceed the additional amount and the threshold cost minus some margin. Control circuitry may assign the first cost to be the total cost minus the second cost. For example, if the threshold cost is $3, control circuitry may determine that the cost to the secondary subscriber exceeds the threshold cost by $1. The control circuitry may then assign the secondary subscriber's cost to be $3.50 and the primary subscriber's cost to be $6.50.

In some embodiments, control circuitry may add to at least one of the first cost and the second cost a service fee, where the service fee comprises at least one of: a pre-determined percentage of the second cost, a pre-determined percentage of the first cost, a pre-determined flat fee, and a pre-determined percentage of the total cost. For example, there may be a pre-determined flat fee of $0.50 to be added to the cost of the primary subscriber. Following from the example above where secondary subscriber's cost was $3.50 and the primary subscriber's cost was $6.50, control circuitry may add the flat fee to the primary subscriber's cost. The primary subscriber's cost is then $7.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DESCRIPTION

Figure 1:
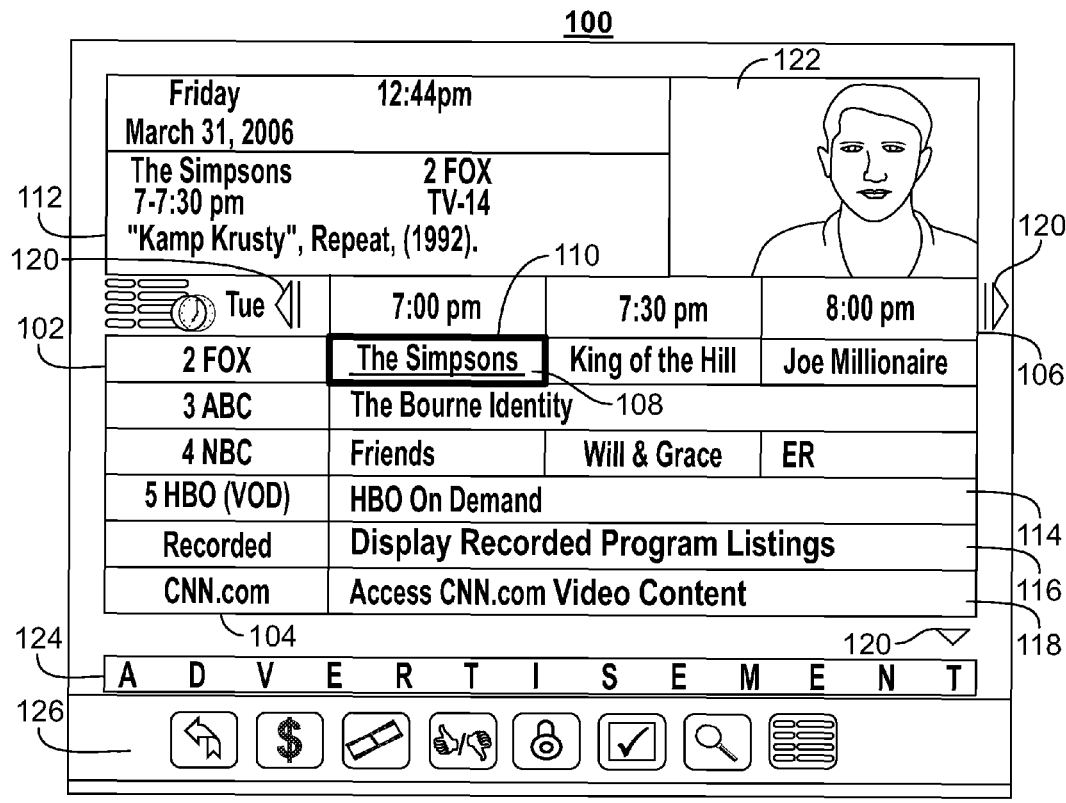
FIG. 1 shows an illustrative embodiment of a display screen that may be used to provide media guidance application listings and other media guidance information, in accordance with some embodiments of the disclosure.

Systems and methods are provided herein for sharing cost of a video subscription of a primary subscriber with a secondary subscriber. These systems and methods provide the secondary subscriber with access to the primary subscriber's video subscription and track a variety of metrics pertaining to access of the video subscription by each subscriber. These systems and methods determine, based on the access metrics, the relative usage of the video subscription by each subscriber and split the total cost of the subscription among them accordingly.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
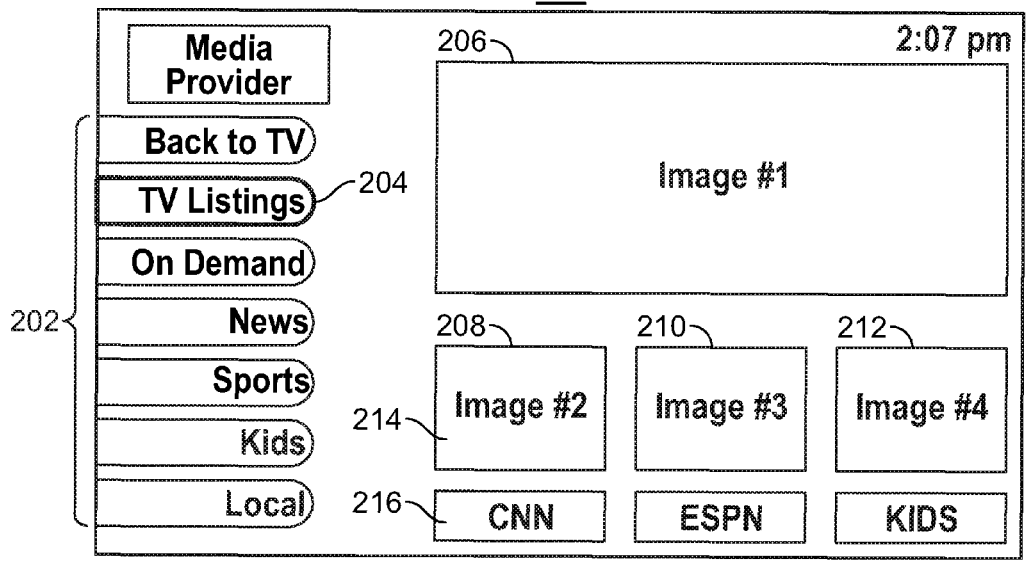
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other pre-defined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a pre-determined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
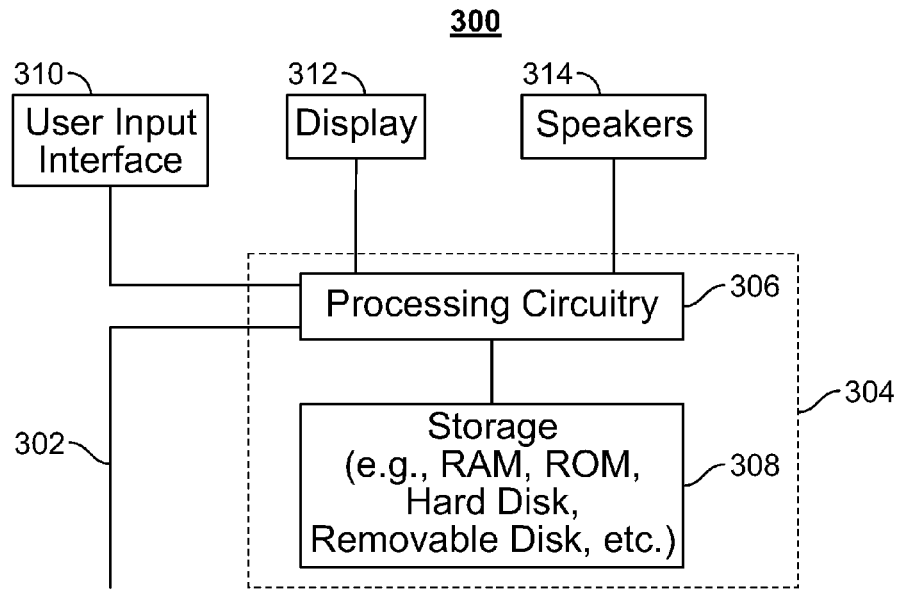
FIG. 3 is a block diagram of an illustrative user equipment (UE) device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Control circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
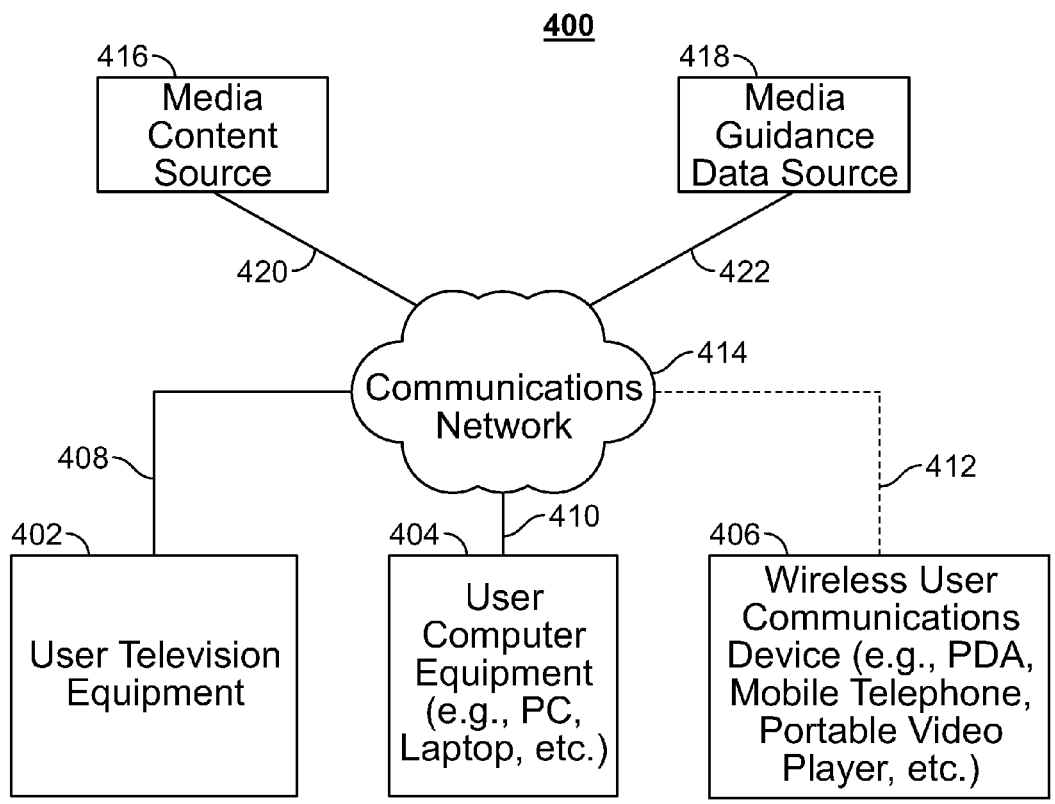
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YouTube, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred to herein, the term "in response to" refers to initiated as a result of. For example, a first action being performed in response to another action may include interstitial steps between the first action and the second action. As referred to herein, the term "directly in response to" refers to caused by. For example, a first action being performed directly in response to another action may not include interstitial steps between the first action and the second action.

Figure 5:
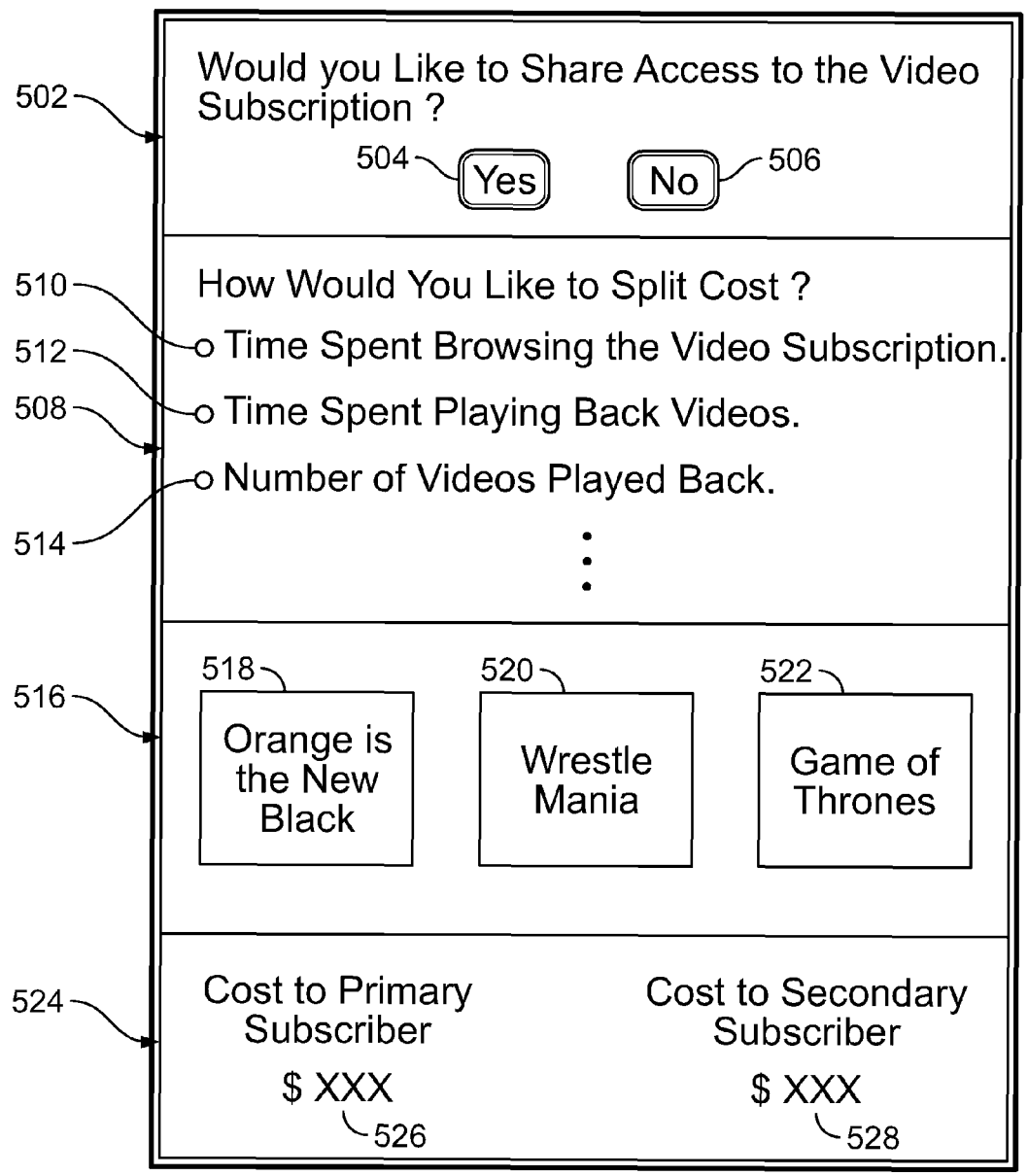
FIG. 5 depicts a user equipment, configured to generate for display a video consumption application to a subscriber, in accordance with some embodiments of this disclosure.

FIG. 5 depicts a user equipment, configured to generate for display a video consumption application to a subscriber, in accordance with some embodiments of this disclosure. FIG. 5 depicts user equipment 500 which may have any of the described capabilities of user television equipment 402, user computer equipment 404, and wireless user communications device 406. User equipment 500 may generate for display a variety of display screens (e.g., display screens 502, 508, 516 and 524). Control circuitry 304 may cause display screen 502, 508, 516 and 524 to be displayed on display 312.

Display screen 502 is an example of an interactive display for receiving a request from a subscriber to share access to the video subscription. Display screen 502 may display a prompt such as "Do you want to share access to the video subscription?" and selectable options "Yes" 504 and "No" 506. Display screen 508 is an example of an interactive display for receiving input from the subscriber about which metric to use for determining relative usage of the video subscription. Display screen 508 may display a prompt such as "How would you like to split cost?" and selectable options (e.g., "Time spent browsing the subscription" 510, "Time spent viewing videos" 512 and "Number of videos viewed" 514).

Display screen 516 is an example of a video consumption application user interface. Display screen 516 may display a variety of video asset identifiers such as text listings "Orange is the New Black" 518, "Wrestle Mania" 520 and "Game of Thrones" 522. Display screen 524 displays cost to the primary subscriber 526 and cost to the secondary subscriber 528 of sharing the video subscription.

In some embodiments, control circuitry (e.g., control circuitry 304) may enable sharing the cost of a video subscription of a primary subscriber (e.g., user A) with a secondary subscriber (e.g., user B) based on relative usage of the video subscription by each subscriber. For example, control circuitry 304 may provide user B with access to user A's video subscription. Control circuitry 304 may monitor the time spent by both user A and user B browsing the video subscription. As a matter of example, user A may spend 30 hours and user B may spend 20 hours browsing the video subscription. Based on these values, control circuitry 304 may determine that user A's relative usage is 1.5 times more than user B's, and may split the cost of the subscription accordingly. Control circuitry 304 may calculate user A's cost to be sixty percent and user B's cost to be forty percent of the total cost.

In some embodiments, control circuitry 304 may receive a request from the secondary subscriber to share access to the primary subscriber's video subscription. For example, control circuitry 304 may detect that user B has used user input interface 310 to select selectable option "Yes" 504 on display screen 502. Similarly, control circuitry 304 may also receive a request from User A to share access to his/her video subscription via display screen 502 and user input interface 310.

In some embodiments, control circuitry 304 may determine whether the primary subscriber is eligible to share access by comparing the access of the video subscription by the primary subscriber for a previous pre-determined period of time to a threshold. The threshold could be any combination of: maximum number of videos viewed, maximum number of videos of a specific category viewed, maximum time spent browsing the subscription etc. For example, threshold could be 50 videos or 5 videos that are proprietary videos of the video consumption application or 100 hours of subscription browsing time.

In order to determine whether the primary subscriber has exceeded the threshold, control circuitry 304 may access a data structure that stores information about user A's access to the video subscription to retrieve the entries for user A's various access metrics such as number of videos viewed, number of videos of a specific category viewed, browsing time, etc. This data structure may be stored in a database associated with user A's video consumption application account (e.g., user A's account database) or a different database, located at a media guidance data source 418. Control circuitry 304 may access this database through a communications network 414. Control circuitry 304 may then access another data structure in user A's account database or a different database to determine the entries for the threshold parameters. Control circuitry 304 may use a database management language (e.g., SQL, JAPQL, CODASYL) to compare the values of user A's access metrics to those of the threshold parameters to determine whether user A is eligible to share access to his/her video subscription. As a matter of example, if user A has browsed the subscription for 30 hours and viewed a total of 30 videos and has viewed 4 videos that are proprietary videos of the video consumption application, control circuitry 304 may determine user A is eligible to share access to his/her subscription.

Upon determining that the primary subscriber is eligible to share access to the video subscription, control circuitry 304 may update an entry in a database to indicate that the subscription is available for sharing. Following from the example above, control circuitry 304, upon determining user A is eligible to share access to the video subscription, may update an entry in user A's account database to indicate that the video subscription is available for sharing. As a matter of example, control circuitry 304 may use an SQL UPDATE statement to perform the updating.

In some embodiments, control circuitry 304 may generate for display a plurality of selectable options corresponding to the plurality of metrics corresponding to the access of the video subscription by the primary subscriber and by the secondary subscriber. For example, control circuitry 304 may generate for display screen 502, which is described above. Control circuitry 304 may receive from the primary subscriber and/or the secondary subscriber a selection of a selectable option of the plurality of selectable options. For example, using user input interface 310, user A may select options 510 and 514 and user B may select options 512 and 514 on the display screen 502. Control circuitry 304 may detect all of these selections.

In some embodiments, control circuitry 304 may determine relative usage of the video subscription by the primary and the secondary subscriber based on the access metric selected by the primary and/or secondary subscriber. Control circuitry 304 may prioritize the access metrics selected by user A over access metrics selected by user B and vice versa or give selections of both user A and user B equal priority. Control circuitry 304 may access a data structure with information about the policies for user A's account (e.g., policies data structure) to determine how to prioritize the user selections. The policies data structure may be stored in user A's account database or a separate database. As a matter of example, the policy for user A's account regarding the priority of metric selected by a subscriber may be that mutual selection gets top priority followed by user A's selection followed by user B's selection. In this case, following from the example above, control circuitry 304 may determine to use the "number of videos viewed" metric (i.e., the mutually selected option 514) to determine relative usage.

In some embodiments, control circuitry 304 may provide the secondary subscriber with access to the primary subscriber's video subscription. For example, control circuitry 304 may allow user B to log in to user A's account for the video consumption application. Upon log-in, control circuitry 304 may generate for display a video consumption application interface such as display screen 516. Control circuitry 304 may communicate with media content source 416 and media guidance data source 418 to determine the various video asset identifiers, such as 518, 520 and 522, to be displayed on display screen 516.

In some embodiments, control circuitry 304 may provide the secondary subscriber with access to all or a subset of the primary subscriber's video subscription. For example, control circuitry 304 may determine which videos the secondary subscriber will have access to based on some criteria such as the popularity of a video, release date of a video, the number of play backs allowed for a video, the source of a video, etc. The information regarding the criteria of videos that the secondary subscriber will not have access to may be stored in a policies data structure. The policies data structure may be located in a database associated with the primary subscriber's video subscription or a different database.

For instance, control circuitry 304 may access a policies data structure in user A's account database, located at media guidance data source 418, to determine the categories of videos that user B will not have access to. As a matter of example, control circuitry 304 may determine that user B will not have access to videos released during the year 2015. Control circuitry 304 may then access a database (e.g., video listings database located at media guidance data source 418) that contains a list of the videos included in user A's subscription and the metadata corresponding to each video. The metadata corresponding to each video may contain information about various properties of the video such as title, genre, release date, popularity, number of playbacks allowed, source, etc. Control circuitry 304 may parse the metadata associated with each video to extract the relevant information (i.e., the release dates, in this example). Control circuitry 304 may then query the video listings database, using the SQL SELECT command, for example, for videos not released during the year 2015. Similarly, if control circuitry 304 determines that user B is not allowed access to videos which are allowed only one play-back, then control circuitry 304 may parse the metadata for each video to extract the number of playbacks information. Control circuitry 304 may then query the video listings database for videos which are allowed more than one playback. Control circuitry 304 may then generate for display to user B video asset identifiers corresponding to the results of the query on display screen 516.

In some embodiments, control circuitry 304 may monitor access of the primary subscriber's video subscription by the primary subscriber and by the secondary subscriber. Control circuitry 304 may determine which subscriber is accessing the video subscription based on the log-in credentials entered by the subscriber. The log-in credential of each user is a unique identifier and may be a string of characters for example. The log-in credentials of both user A and user B may be stored in user A's account database, located at media guidance data source 418. Alternatively, the log-in credentials of user A and user B may be stored in separate databases at media guidance data source 418. By comparing the entered log-in credentials with those stored in user A's account database, control circuitry 304 may determine whether user A or user B is accessing the video subscription. For example, control circuitry 304 may instruct database management language SQL to perform the comparison of the entered log-in credentials with the stored log-in credentials (i.e., two strings) using the string compare STRCMP( ) function to determine whether the entered log-in credentials correspond to user A or to user B.

In some embodiments, control circuitry 304 may monitor, for each subscriber, parameters that pertain to access of the video subscription such as the time spent browsing the subscription. For example, control circuitry 304 may determine the time spent browsing the subscription by detecting the start time and the stop time of browsing the subscription. Start time is defined as the time when the subscriber logs in to the video consumption application or the time when the subscriber starts using the video consumption application after having been inactive for a period of time, while still logged into the video consumption application. Stop time is defined as the time when the subscriber logs out of the video consumption application or the time when the subscriber stops using the video consumption application for a predefined period of time (e.g., idling stop time). Control circuitry 304 may determine the time spent browsing the subscription by calculating the time elapsed between the start time and the stop time.

As a matter of example, user A logs in to the video consumption application at 8:00 A.M. and control circuitry 304 may detect the start time to be 8:00 A.M. The idling stop time may be 5 minutes and the value of the idling stop time may be stored in a policies data structure, located at media guidance data source 418. Control circuitry 304 may detect at 8:40 AM that user A has not used the subscription for 5 minutes. Control circuitry may detect inactivity by a user on the video consumption application when there is no input from the user via the user input interface 310 for a period of time. In this case, control circuitry 304 may detect stop time to be 8:35 AM and may calculate the time spent browsing the subscription to be 35 minutes. If user A starts browsing the video consumption application again at 9:00 A.M., control circuitry 304 may detect the start time to be 9:00 A.M. If user A continuously browses the video consumption application till 10:15 A.M. and then logs out at 10:15 A.M., control circuitry 304 may detect the stop-time to be 10:15 A.M. and may calculate the time spent browsing the subscription to be 75 minutes.

In some embodiments, control circuitry 304 may monitor, for each subscriber, parameters that pertain to access of the video subscription such as the number of videos viewed and the time spent viewing videos. Control circuitry 304 may, for the videos included in the video subscription, generate for display viewing options that can be accessed through the video asset identifiers. For example, upon selection of a video asset identifier, control circuitry 304 may generate for display options such as "View video," "Add to watch list," "View video clip," etc. Control circuitry 304 may detect when the subscriber has selected the "View video" or "View video clip" options via user input interface 310 and control circuitry 304 may update the number of videos viewed accordingly.

For instance, control circuitry 304 may detect that user A has selected the "View video" option for a video "Wrestle Mania" 520 and the "View clip" option for a video "Game of Thrones" 522. Control circuitry 304 may detect the start time of playing a video and the stop time of playing the video. Control circuitry 304 may then calculate the time elapsed between the start time of playing a video and the stop time of playing the video to determine the time spent viewing videos. For example, control circuitry 304 may detect that user A played the video "Wrestle Mania" 520 from 11:00 A.M. (i.e., start time of playing video) to 11:45 A.M. (i.e., stop time of playing video) and control circuitry 304 may calculate time spent viewing video to be 45 minutes.

In some embodiments, control circuitry 304 may update, based on the monitoring, a plurality of metrics corresponding to the access of the video subscription by the primary subscriber and by the secondary subscriber. For example, control circuitry 304 may detect a specific access activity by the primary subscriber or by the secondary subscriber. As a matter of example, control circuitry 304 may detect that user A has watched a video for ten minutes. In response, control circuitry 304 may access the data structure in user A's account database that stores information about user A's access to the video subscription and instruct storage circuitry or user A's account database to increment the value of the "number of videos viewed" metric by one. Similarly, control circuitry 304 may instruct storage circuitry or user A's account database to increment the value of "time spent viewing videos" metric to be incremented by ten minutes. For example, control circuitry 304 may use an SQL UPDATE statement to perform the updating.

In some embodiments, control circuitry 304 may determine, based on a metric of the plurality of metrics corresponding to the access of the video subscription by the primary subscriber and the secondary subscriber, a first relative usage of the video subscription by the primary subscriber and a second relative usage of the video subscription by the secondary subscriber. For example, control circuitry may use the "number of videos viewed" metric to determine relative usage. In order to do so, control circuitry 304 may access a data structure that stores information about user A's access to the video subscription to retrieve a value for the number of videos user A has viewed. Similarly, control circuitry 304 may access another data structure (which may be in the same database or a different database located at media guidance data source 418) that stores information about user B's access to the video subscription to retrieve a value for the number of videos user B has viewed. Using the values, control circuitry 304 may calculate what percentage of the total number of videos viewed was viewed by user A to determine user A's relative usage and what percentage was viewed by user B to determine user B's relative usage. As a matter of example, user A may have viewed 30 videos and user B may have viewed 20 videos. Control circuitry 304 may determine user A's relative usage to be sixty percent and user B's relative usage to be forty percent.

In some embodiments, control circuitry 304 may calculate, based on the relative usage of the video subscription of each user for a given monitoring period, the cost of sharing the video subscription to each user for that period. Control circuitry 304 may divide total cost of the video subscription between the subscribers in accordance to their relative usage. For example, following from the example above where user A's relative usage is sixty percent and user B's relative usage is forty percent, control circuitry 304 may determine user A's cost to be sixty percent and user B's cost to be forty percent of the total video subscription cost. If the total cost for the monitoring period is $10, then control circuitry 304 determines that user A's cost is $6 and user B's cost is $4. Control circuitry 304 may present the cost to each subscriber on user equipment 500, as illustrated by display screen 524.

In some embodiments, after determining cost to each subscriber based on relative usage, control circuitry 304 may determine whether the secondary subscriber's cost exceeds a threshold cost. Control circuitry 304 may determine an additional amount by which the secondary subscriber's cost exceeds the threshold cost. Based on a cost assignment policy in the policies data structure, Control circuitry 304 may assign the secondary subscriber's cost to be a value that is the threshold cost plus some margin where the margin does not exceed the additional amount. Control circuitry 304 may assign the primary subscriber's cost to be the total cost minus the secondary subscriber's cost. For example, the relative usage of user A is sixty percent and of user B is forty percent. The cost of user A's video subscription is $10 and the threshold cost is $3. Control circuitry 304 may determine, based on relative usage, the user A's cost is $6 and user B's cost is $4. Control circuitry 304 may then determine that user B's cost (i.e., $4) exceeds the threshold (i.e., $3). Control circuitry 304 may calculate the additional amount to be $1. Control circuitry 304 may determine the margin to be $0 to $1. Control circuitry 304 may determine user B's cost to be $3 to $4 (i.e., $3+$0 to $1). Control circuitry 304 may determine user A's cost to be $6 to $7 (i.e., $10−$3 to $4).

In some embodiments, after determining cost to each subscriber based on relative usage, control circuitry 304 may determine whether the secondary subscriber's cost exceeds a threshold cost. Based on a cost assignment policy in the policies data structure, control circuitry 304 may assign the secondary subscriber's cost to be a value that is the threshold cost minus some margin and the primary subscriber's cost to be the total cost minus the secondary subscriber's cost. For example, the relative usage of user A is sixty percent and of user B is forty percent. The cost of user A's video subscription is $10 and the threshold cost is $3. Control circuitry 304 may determine, based on relative usage, the user A's cost is $6 and user B's cost is $4. Control circuitry 304 may then determine that user B's cost (i.e., $4) exceeds the threshold (i.e., $3). Control circuitry 304 may determine the margin to be $0 to $4 because user B's cost based on relative usage is $4. Control circuitry 304 may determine user B's cost to be $0 to $4 (i.e., $4−$0 to $4). Control circuitry 304 may determine user A's cost to be $0 to $6 (i.e., $10−$0 to $4).

In some embodiments, control circuitry 304 may add to the primary subscriber's cost a service fee. Based on a cost assignment policy in the policies data structure, the service fee may be a pre-determined percentage of the secondary subscriber's cost. For example, the total cost of the video subscription is $10 and user A's cost is $6 and user B's cost is $4. For example, if the pre-determined percentage is 10%, control circuitry 304 may add a $0.40 service fee to user A's cost. User A's cost then is $6.40 and user B's cost is $4.

In some embodiments, control circuitry 304 may add to the secondary subscriber's cost a service fee. Based on a cost assignment policy in the policies data structure, the service fee may be a pre-determined percentage of the secondary subscriber's cost. For example, the total cost of the video subscription is $10 and user A's cost is $6 and user B's cost is $4. For example, if the pre-determined percentage is 10%, control circuitry 304 may add a $0.40 service fee to user B's cost. User A's cost then is $6 and user B's cost is $4.40.

In some embodiments, control circuitry 304 may add to the primary subscriber's cost a service fee. Based on a cost assignment policy in the policies data structure, the service fee may be a pre-determined percentage of the primary subscriber's cost. For example, the total cost of the video subscription is $10 and user A's cost is $6 and user B's cost is $4. For example, if the pre-determined percentage is 10%, control circuitry 304 may add a $0.60 service fee to user A's cost. User A's cost then is $6.60 and user B's cost is $4.

In some embodiments, control circuitry 304 may add to the secondary subscriber's cost a service fee. Based on a cost assignment policy in the policies data structure, the service fee may be a pre-determined percentage of the primary subscriber's cost. For example, the total cost of the video subscription is $10 and user A's cost is $6 and user B's cost is $4. For example, if the pre-determined percentage is 10%, control circuitry 304 may add a $0.60 service fee to user B's cost. User A's cost then is $6 and user B's cost is $4.60.

In some embodiments, control circuitry 304 may add to the primary subscriber's cost a service fee. Based on a cost assignment policy in the policies data structure, the service fee may be a pre-determined flat fee. For example, the total cost of the video subscription is $10 and user A's cost is $6 and user B's cost is $4. For example, if the flat fee is $1, control circuitry 304 may add a $1 service fee to user A's cost. User A's cost then is $7 and user B's cost is $4.

In some embodiments, control circuitry 304 may add to the secondary subscriber's cost a service fee. Based on a cost assignment policy in the policies data structure, the service fee may be a pre-determined flat fee. For example, the total cost of the video subscription is $10 and user A's cost is $6 and user B's cost is $4. For example, if the flat fee is $1, control circuitry 304 may add a $1 service fee to user B's cost. User A's cost then is $6 and user B's cost is $5.

In some embodiments, control circuitry 304 may add to the primary subscriber's cost a service fee. Based on a cost assignment policy in the policies data structure, the service fee may be a pre-determined percentage of the total cost. For example, the total cost of the video subscription is $10 and user A's cost is $6 and user B's cost is $4. For example, if the pre-determined percentage is 10%, control circuitry 304 may add $1 service fee to user A's cost. User A's cost then is $7 and user B's cost is $4.

In some embodiments, control circuitry 304 may add to the secondary subscriber's cost a service fee. Based on a cost assignment policy in the policies data structure, the service fee may be a pre-determined percentage of the total cost. For example, the total cost of the video subscription is $10 and user A's cost is $6 and user B's cost is $4. For example, if the pre-determined percentage is 10%, control circuitry 304 may add a $1 service fee to user B's cost. User A's cost then is $6 and user B's cost is $5.

In some embodiments, control circuitry 304 may allow the secondary subscriber to share access to several video subscriptions of the primary subscriber via an aggregator platform. Control circuitry 304 may generate for display on the aggregator platform selectable options that correspond to the separate video subscriptions of the primary subscriber that are available for sharing. For example, user A may have three separate video subscriptions for three different video consumption applications (e.g., video subscription X, video subscription Y, and video subscription Z). Control circuitry 304 may determine, in manners described earlier, user A is eligible to share accesses to video subscriptions X, Y, and Z and may then generate for display selectable options corresponding to video subscriptions X, Y, and Z on the aggregator platform.

In some embodiments, control circuitry 304 may, on a video subscription aggregator platform, receive a request from the secondary subscriber to share access to several video subscriptions of the primary subscriber. For example, control circuitry 304 may receive a request from user B to share access to user A's video subscriptions X and Y. Manners in which control circuitry 304 may receive this request discussed above are applicable here. Upon receiving the request, control circuitry 304 may provide the secondary subscriber with access to the video subscriptions.

In some embodiments, control circuitry 304 may determine a different subset of videos for each video subscription to which the secondary subscriber will not have access. Manners in which control circuitry 304 may perform this identification discussed above are applicable here. As a matter of example, control circuitry 304 may determine user B will not have access to videos included in video subscription X that were released in 2015 and may determine user B will not have access to videos included in video subscription Y that allow only one playback.

In some embodiments, control circuitry 304 may treat each video subscription of the primary subscriber that the secondary subscriber shares access to as a separate entity. For example, control circuitry 304 may determine the cost of sharing video subscription X based only on the relative usage and total cost of video subscription X, in manners described above. Similarly, control circuitry may determine the cost of sharing video subscription Y based only on the relative usage and total cost of video subscription Y, in manners described above.

In some embodiments, control circuitry 304 may treat some video subscription of the primary subscriber that the secondary subscriber shares access to as part of a single total video subscription. Control circuitry 304 may determine the cost of sharing the total video subscription based on the relative usage and total cost of total video subscription, in manners described above. Total cost of the total video subscription may be the sum of the individual total costs of individual video subscriptions shared or some other arbitrary amount. For example, user B may share access to video subscriptions X, Y and Z of user A via the aggregator platform. Control circuitry 304 may treat video subscription X as a separate entity and may determine the cost of sharing video subscription X based only on the relative usage and total cost of video subscription X. Control circuitry 304 may treat video subscriptions Y and Z as a single total video subscription (e.g., subscription T). Control circuitry 304 may then determine the cost of sharing video subscription T based only the relative usage and total cost of video subscription T, in manners described above.

In some embodiments, control circuitry 304 may receive a request from the secondary subscriber to purchase access to only specific videos in the primary subscriber's video subscription(s). For example, user A's video subscriptions X, Y, and Z are available for sharing. User B is interested only in viewing video 1 and video 2 included in video subscription X and video 3 included in video subscription Y. User B can request access to only videos 1, 2, and 3, in manners described above. In this case, user B's cost would be determined based on the price of each video. The price of each video may be a flat price or a variable price based on the property of the video, such as the popularity, the release date or the source of the video. For example, the price of videos 1 and 3 may be $1 and the price of video 3 may be $2. Based on the prices, control circuitry 304 may determine user B's cost for videos 1, 2 and 3 is $4. Control circuitry 304 may determine the primary subscriber's cost to be total cost of the subscription minus the secondary subscriber's cost. For example, the cost of video subscriptions X and Y may be $10 each. Control circuitry 304 may determine user A's cost for video subscription X to be $7 and may determine user A's cost for video subscription Y to be $9.

In some embodiments, where the secondary subscriber purchases access to specific videos in the in the primary subscriber's video subscription, control circuitry 304 may add a service fee to the primary subscriber's cost. The service fee may have any of the properties discussed above. For instance, following from the example above, the service fee for video subscription X is flat fee of $0.25 per video. Control circuitry 304 may add $0.50 service fee to user A's cost for subscription X, resulting in a total of $7.50.

In some embodiments, where the secondary subscriber purchases access to specific videos in the in the primary subscriber's video subscription, control circuitry 304 may add a service fee to the secondary subscriber's cost. The service fee may have any of the properties discussed above. For instance, following from the example above, the service fee for video subscription X is flat fee of $0.25 per video. Control circuitry 304 may add $0.50 service fee to user B's cost for videos 1 and 2, resulting in a total of $3.50.

Figure 6:
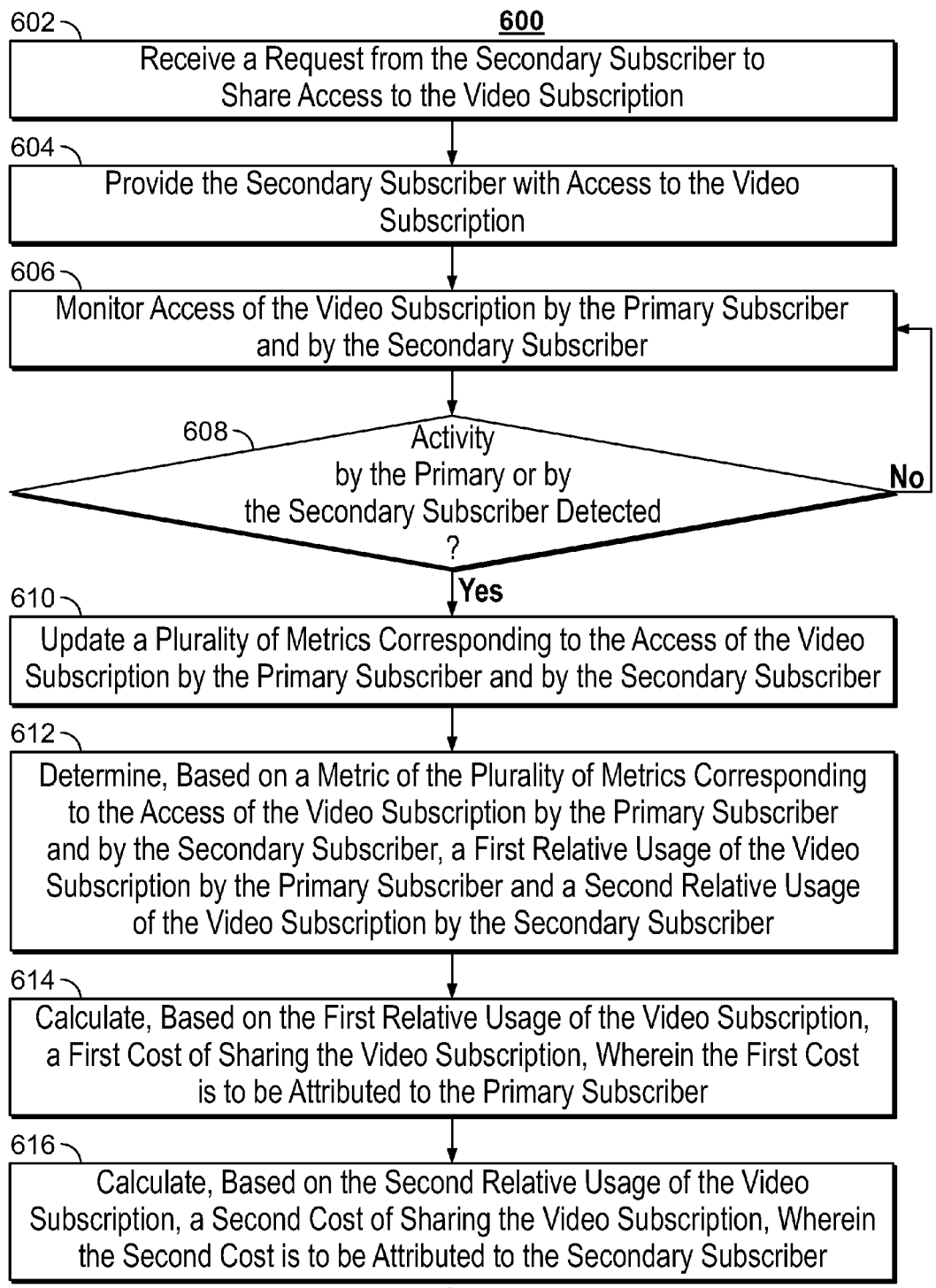
FIG. 6 is a flowchart of illustrative steps involved in sharing the video subscription of a primary subscriber with a secondary subscriber, determining the relative usage of the service by each subscriber, and based on the relative usage, determining the cost to each subscriber, in accordance with some embodiments of the disclosure.

FIG. 6 is a flowchart of illustrative steps involved in sharing the cost of a video subscription of a primary subscriber with a secondary subscriber, determining the relative usage of the service by each subscriber and based on the relative usage, determining the cost to each subscriber, in accordance with some embodiments of the disclosure. For example, process 600 may be executed by control circuitry 304 (FIG. 3) as instructed by control circuitry implemented on user equipment 402, 404, and/or 406 (FIG. 4) in order to share the cost of a video subscription of a primary subscriber with a secondary subscriber. In addition, one or more steps of process 600 may be incorporated into or combined with one or more steps of any other process or embodiment.

Process 600 begins at 602, where control circuitry 304 may receive a request from the secondary subscriber (e.g., user B) to share access to the video subscription. For example, control circuitry 304 may detect that the secondary subscriber has selected the selectable option "Yes" 504 at user equipment 502 to indicate the desire to share a video subscription.

Process 600 may continue to 604, where control circuitry 304 may provide the secondary subscriber with access to the video subscription. For example, control circuitry 304 may allow user B to log into user A's account for a video consumption application. Upon log-in, control circuitry 304 may generate for display a video consumption application interface such as display screen 516. Control circuitry 304 may communicate with media content source 416 and media guidance data source 418 to determine the various video asset identifiers, such as 518, 520 and 522, to be displayed on display screen 516. In response to user B selecting a video asset identifier, control circuitry 304 may access media content source 416 for the corresponding video and transmit it for displayed via communication network 414 and communication paths 420 to user equipment 500.

Process 600 may continue to 606, where control circuitry 304 may monitor access of the video subscription by the primary subscriber and by the secondary subscriber. For example, control circuitry 304 may determine whether user A or user B is accessing the video subscription by comparing the log-in credentials entered via user input interface 310 to those saved in a database (e.g., a database that stores information about user A's account for video consumption application) in storage 308. Control circuitry 304 may monitor various parameters indicative of access to the video subscription such as "time spent browsing the subscription," "time spent viewing videos," "number of videos viewed," etc.

Process 600 may continue to 608, where control circuitry 304 may detect activity by the primary subscriber or by the secondary subscriber. If no activity is detected, process 600 may revert to 606 where control circuitry 304 may continue to monitor access of the video subscription by the primary subscriber and the secondary subscriber. If control circuitry 304 detects an activity, process 600 may continue to 610, where control circuitry 304 may update a plurality of metrics corresponding to the access of the video subscription by the primary subscriber and the secondary subscriber. For example, control circuitry 304 may receive an indicia that indicates that user A has viewed a video for ten minutes. In response, control circuitry 304 may access a data structure in storage 308 that stores information about user A's access of the video subscription. In the data structure, control circuitry 304 may instruct storage circuitry or the database to increment the value of "number of videos viewed" metric by one and may instruct storage circuitry or the database to increment the "time spent viewing videos" metric by ten minutes.

Process 600 may continue to 612, where control circuitry 304 may determine, based on a metric of the plurality of metrics corresponding to the access of the video subscription by the primary subscriber and by the secondary subscriber, a first relative usage of the video subscription by the primary subscriber and a second relative usage of the video subscription by the secondary subscriber. For example, control circuitry 304 may use the "number of videos viewed" metric to determine the relative usage of user A and of user B.

Process 600 may continue to 614 which pertains to determining the cost for the primary subscriber. At 614, control circuitry 304 may calculate, based on the first relative usage of the video subscription, a first cost of sharing the video subscription, wherein the first cost is to be attributed to the primary subscriber. Process 600 may continue to 616 which pertains to determining the cost for the secondary subscriber. At 616, control circuitry 304 calculates, based on the second relative usage of the video subscription, a second cost of sharing the video subscription, wherein the second cost is to be attributed to the secondary subscriber. Control circuitry 304 may present the cost of sharing the video subscription to user A and to user B via display screen 524.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 6.

Figure 7:
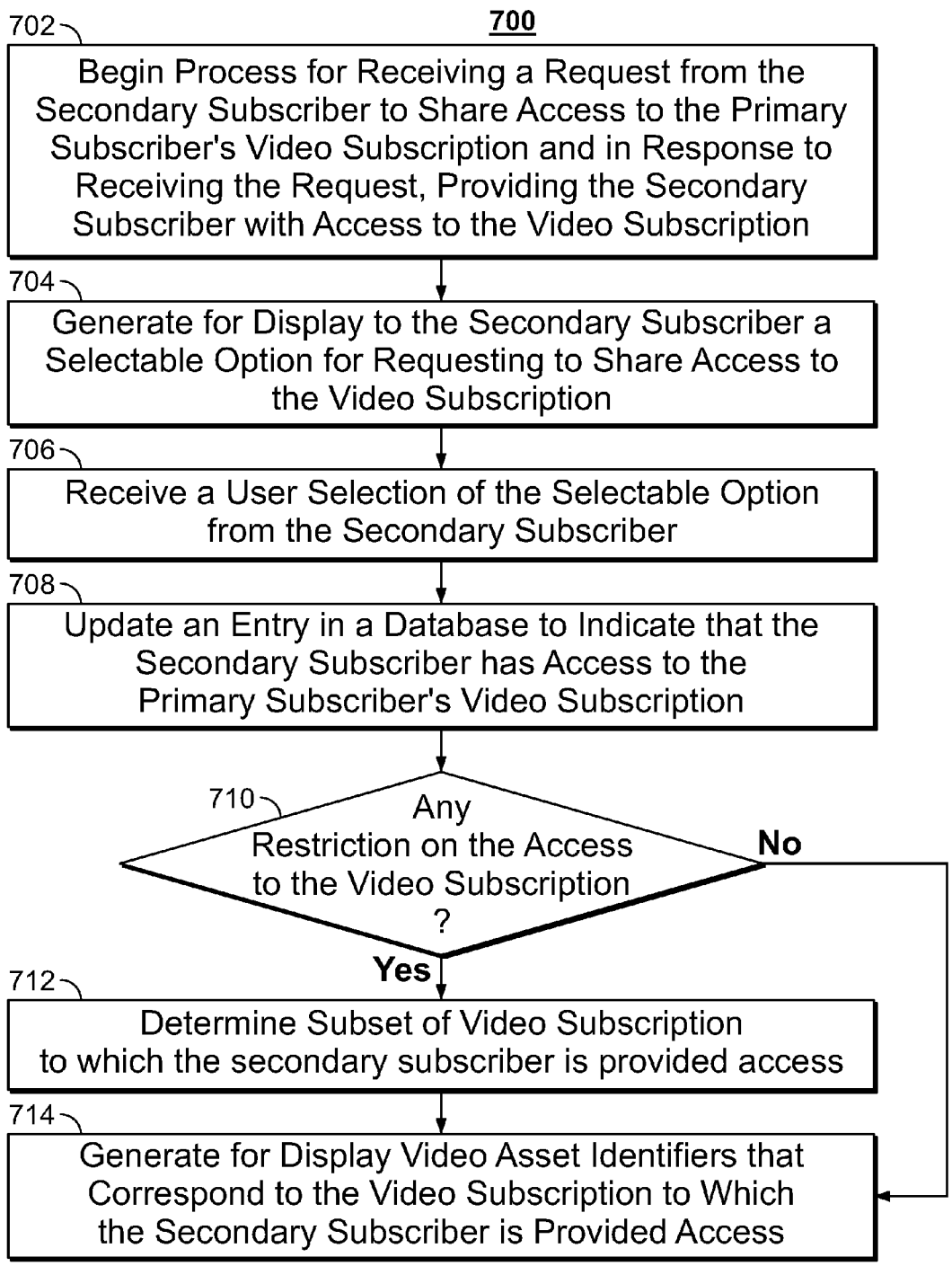
FIG. 7 is a flowchart of illustrative steps involved in receiving a request from the secondary subscriber to share access to the primary subscriber's video subscription and providing the secondary subscriber with access to the video subscription, in accordance with some embodiments of the disclosure.

FIG. 7 is a flowchart of illustrative steps involved in receiving a request from the secondary subscriber to share access to the primary subscriber's video subscription and providing the secondary subscriber with access to the video subscription, in accordance with some embodiments of the disclosure. It should be noted that process 700 or any step thereof could be performed on, or provided by, any of the devices shown in FIGS. 3-5. For example, process 700 may be executed by control circuitry 304 (FIG. 3) as instructed by control circuitry implemented on user equipment 402, 404, and/or 406 (FIG. 4) in order to receive a request from the secondary subscriber to share access to the primary subscriber's video subscription and provide the secondary subscriber with access to the video subscription. In addition, one or more steps of process 700 may be incorporated into or combined with one or more steps of any other process or embodiment.

Process 700 begins at 702, where control circuitry 304 begins the process for receiving a request from the secondary subscriber to share access to the primary subscriber's video subscription and in response to receiving the request, providing the secondary subscriber with access to the video subscription. Control circuitry 304 may execute 702 when 602 and 604 of process 600 begin. Process 700 may continue to 704, where control circuitry 304 may generate for display to the secondary subscriber a selectable option for requesting to share access to the video subscription as illustrated in display screen 502. Process 700 may continue to 706, where control circuitry 304 may receive a user selection of the selectable option from the secondary subscriber to indicate the desire to share a video subscription. For example, control circuitry 304 may detect user B has chosen, using user input interface 310, selectable option "Yes" 504 at display screen 502. Process 700 may continue to 708, where control circuitry 304 may update a database at storage 308 to indicate that the secondary subscriber has access to the primary subscriber's video subscription.

Process 700 may continue to 710, where control circuitry 304 may determine whether there is to be any restriction on the access to the video subscription. Manners in which control circuitry 304 may perform this determination discussed above and below are applicable here. If, at 710, control circuitry 304 determines that there is a restriction on the access to the video subscription, process 700 may continue to 712. At 712, control circuitry 304 may determine subset of the video subscription to which the secondary subscriber is provided access. Manners in which control circuitry 304 may perform this determination discussed above and below are applicable here.

If, at 710, control circuitry 304 determines that there is no restriction on the access to the video subscription, process 700 may continue to 714. Similarly, process 700 continues from 712 to 714. At 714, control circuitry 304 generates for display video asset identifiers that correspond to the video subscription to which the secondary subscriber is provided access. For example, at 714, control circuitry 304 may access media content source 416 and media guidance data source 418 to determine the various video assets that user B will have access to. Control circuitry 304 may generate for display a video consumption application interface such as display screen 516 with the corresponding video asset identifiers.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 7.

Figure 8:
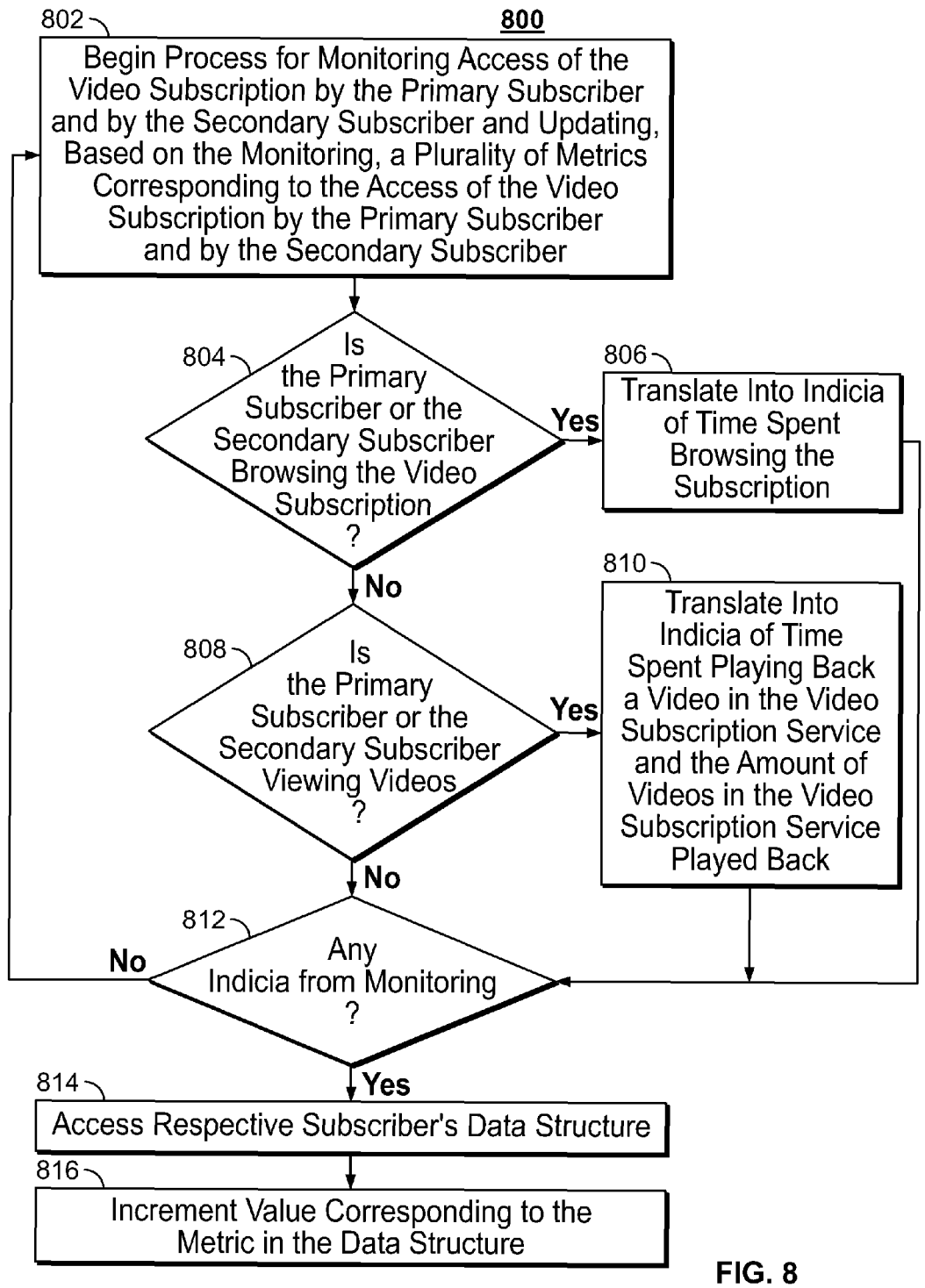
FIG. 8 is a flowchart of illustrative steps involved in monitoring access of the video subscription by the primary subscriber and the secondary subscriber and updating a plurality of metrics corresponding to the access of the video subscription by the primary subscriber and the secondary subscriber, in accordance with some embodiments of the disclosure.

FIG. 8 is a flowchart of illustrative steps involved in monitoring access of the video subscription by the primary subscriber and by the secondary subscriber and updating a plurality of metrics corresponding to the access of the video subscription by the primary subscriber and by the secondary subscriber, in accordance with some embodiments of the disclosure. It should be noted that process 800 or any step thereof could be performed on, or provided by, any of the devices shown in FIGS. 3-5. For example, process 800 may be executed by control circuitry 304 (FIG. 3) as instructed by control circuitry implemented on user equipment 402, 404, and/or 406 (FIG. 4) in order to monitor access of the video subscription by the primary subscriber and the secondary subscriber. In addition, one or more steps of process 800 may be incorporated into or combined with one or more steps of any other process or embodiment.

Process 800 begins at 802, where control circuitry 304 begins the process for monitoring access of the video subscription by the primary subscriber and by the secondary subscriber and updating, based on the monitoring, a plurality of metrics corresponding to the access of the video subscription by the primary subscriber and by the secondary subscriber. Control circuitry 304 may execute 802 when 606, 608 and 610 of process 600 begin. Process 800 may continue to 804, where control circuitry 304 may determine if the primary subscriber or the secondary subscriber is browsing the video subscription. For example, control circuitry 304 may determine whether user A or user B is accessing the video subscription by comparing log-in credentials entered via user input interface 310 to those saved in storage 308. Manners in which control circuitry 304 may perform this determination discussed above and below are applicable here.

If, at 804, control circuitry 304 determines that the primary subscriber or the secondary subscriber is browsing the video subscription, process 800 may continue to 806. At 806, control circuitry 304 translates detection of browsing activity into indicia of time spent browsing the subscription by a subscriber. If, at 804, control circuitry 304 determines that neither the primary subscriber nor the secondary subscriber is browsing the video subscription, process 800 may continue to 808. At 808, control circuitry 304 determines if the primary subscriber or the secondary subscriber is viewing videos.

If, at 808, control circuitry 304 determines that the primary subscriber or the secondary subscriber is viewing videos, process 800 may continue to 810. At 810, control circuitry 304 translates detection of a subscriber viewing a video into indicia of time spent playing back a video in the video subscription service and the number of videos in the video subscription service played back by a subscriber. For example, control circuitry 304 may detect user A has viewed a video for ten minutes and translate this into an indicia.

If, at 808, control circuitry 304 determines that neither the primary subscriber nor the secondary subscriber is viewing videos, process 800 may continue to 812. Process 800 may continue to 812 from 806 and 810. At 812, control circuitry 304 may determine whether there is an indicia from monitoring. If, at 812, there is no indicia from monitoring, process 800 reverts to 802. If, at 812, control circuitry 304 detects there is indicia from monitoring, process 800 may continue to 814. In this example, process 800 would detect an indicia that subscriber A viewed a video for ten minutes. At 814, control circuitry 304 may access respective subscriber's data structure at storage 308. For example, control circuitry 304 may access a data structure in storage 308 that stores information about user A's access to the video subscription. Process 800 may continue to 816 where control circuitry 304 may increment the values of the respective metrics in the data structure. For example, control circuitry 304 may instruct storage circuitry in storage 308 or the database to increment the values corresponding to the "number of videos viewed" by one and may instruct storage circuitry in storage 308 or the database to increment the values corresponding to the "time spent playing back a video" by ten minutes.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 8.

Figure 9:
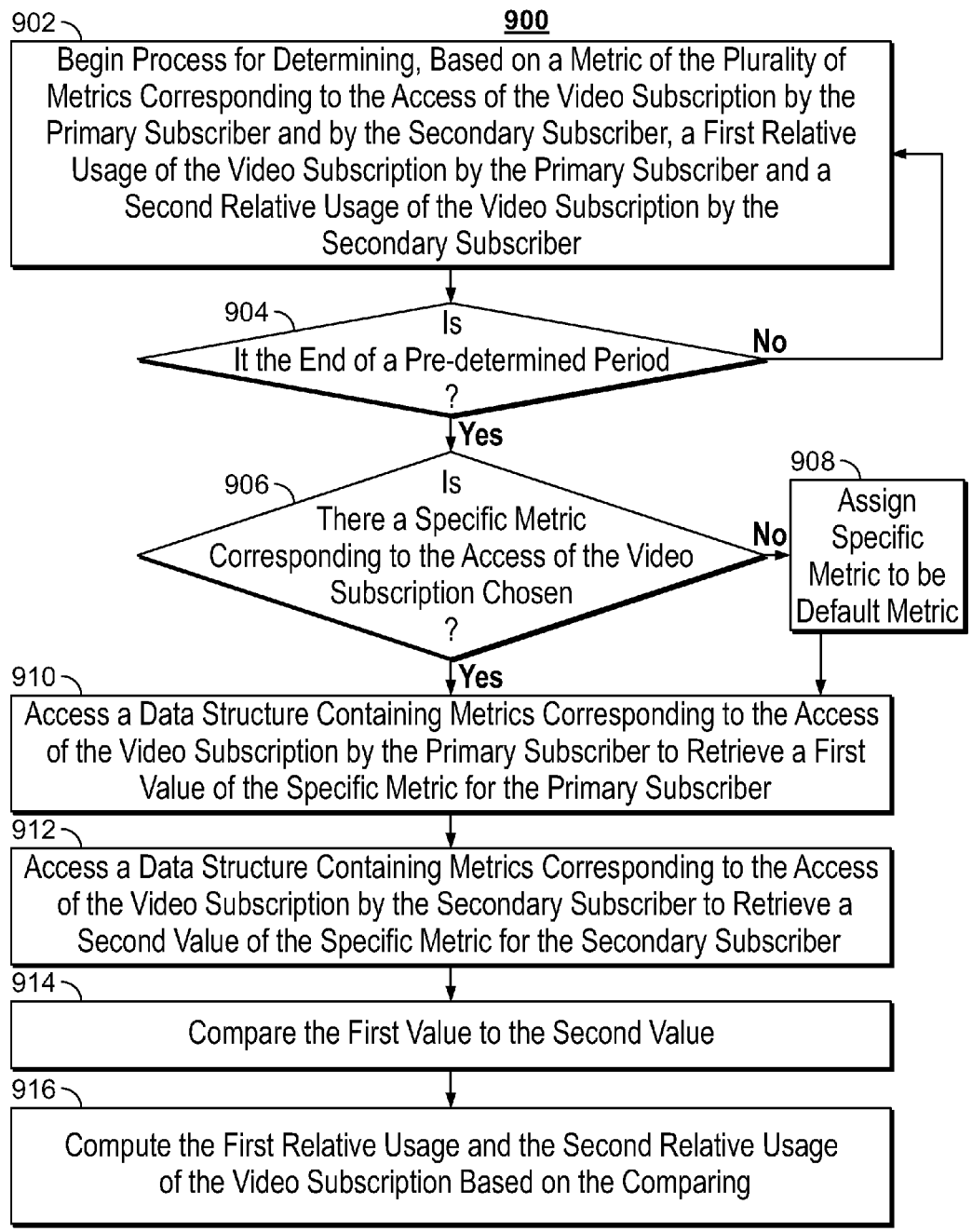
FIG. 9 is a flowchart of illustrative steps involved in determining, based on a metric corresponding to the access of the video subscription by the primary subscriber and the secondary subscriber, a first relative usage of the video subscription by the primary subscriber and a second relative usage of the video subscription by the secondary subscriber, in accordance with some embodiments of the disclosure.

FIG. 9 is a flowchart of illustrative steps involved in determining, based on a metric corresponding to the access of the video subscription by the primary subscriber and by the secondary subscriber, a first relative usage of the video subscription by the primary subscriber and a second relative usage of the video subscription by the secondary subscriber, in accordance with some embodiments of the disclosure. It should be noted that process 900 or any step thereof could be performed on, or provided by, any of the devices shown in FIGS. 3-5. For example, process 900 may be executed by control circuitry 304 (FIG. 3) as instructed by control circuitry implemented on user equipment 402, 404, and/or 406 (FIG. 4) in order to determine the first relative usage and the second relative usage of the video subscription. In addition, one or more steps of process 900 may be incorporated into or combined with one or more steps of any other process or embodiment.

Process 900 begins at 902, where control circuitry 304 begins the process for determining, based on a metric of the plurality of metrics corresponding to the access of the video subscription by the primary subscriber and by the secondary subscriber, a first relative usage of the video subscription by the primary subscriber and a second relative usage of the video subscription by the secondary subscriber. Control circuitry 304 may execute 902 when 612 of process 600 begins. Process 900 may continue to 904, where control circuitry 304 may determine whether it is the end of a pre-determined period. Manners in which control circuitry 304 may perform this determination, discussed above and below, are applicable here. If, at 904, control circuitry 304 determines that it is not the end of the pre-determined period, process 900 may revert to 902. For example, the pre-determined period could be a month corresponding to the billing cycle starting on the 1$^{st}$ of each month.

If, at 904, control circuitry 304 determines that it is the end of the pre-determined period, process 900 may continue to 906, where control circuitry 304 may determine if there is a specific metric corresponding to the access of the video subscription chosen. For example, the specific metric could be the "number of videos viewed."

If, at 906, control circuitry 304 determines that there is no specific metric corresponding to the access of the video subscription chosen, process 900 may continue to 908 where control circuitry 304 may assign the specific metric to be a default metric. If, at 906, control circuitry 304 determines that there is a specific metric corresponding to the access of the video subscription chosen, process 900 may continue to 910, where control circuitry 304 may access a data structure containing metrics corresponding to the access of the video subscription by the primary subscriber to retrieve a first value of the specific metric for the primary subscriber. For example, control circuitry 304 may access a data structure in storage 308 that stores information about the User A's access to the video subscription. Control circuitry 304 may retrieve the value corresponding to the "number of videos viewed" in the data structure. For example, the value may be 30.

Process 900 may continue to 912 where control circuitry 304 may access a data structure containing metrics corresponding to the access of the video subscription by the secondary subscriber to retrieve a second value of the specific metric for the secondary subscriber. For example, control circuitry 304 may access a data structure in storage 308 that stores information about the User B's access to the video subscription. Control circuitry 304 may retrieve the value corresponding to the "number of videos viewed" in the data structure. For example, the value may be 20.

Process 900 may continue to 914 where control circuitry 304 may compare the first value to the second value. Process 900 may continue from 914 to 916 where control circuitry 304 may compute the first relative usage and the second relative usage based on the comparing. In this instance, where the first value is 30 and the second value is 20, control circuitry 304 may determine first relative usage to be sixty percent and the second relative usage to be forty percent.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 9.

Figure 10:
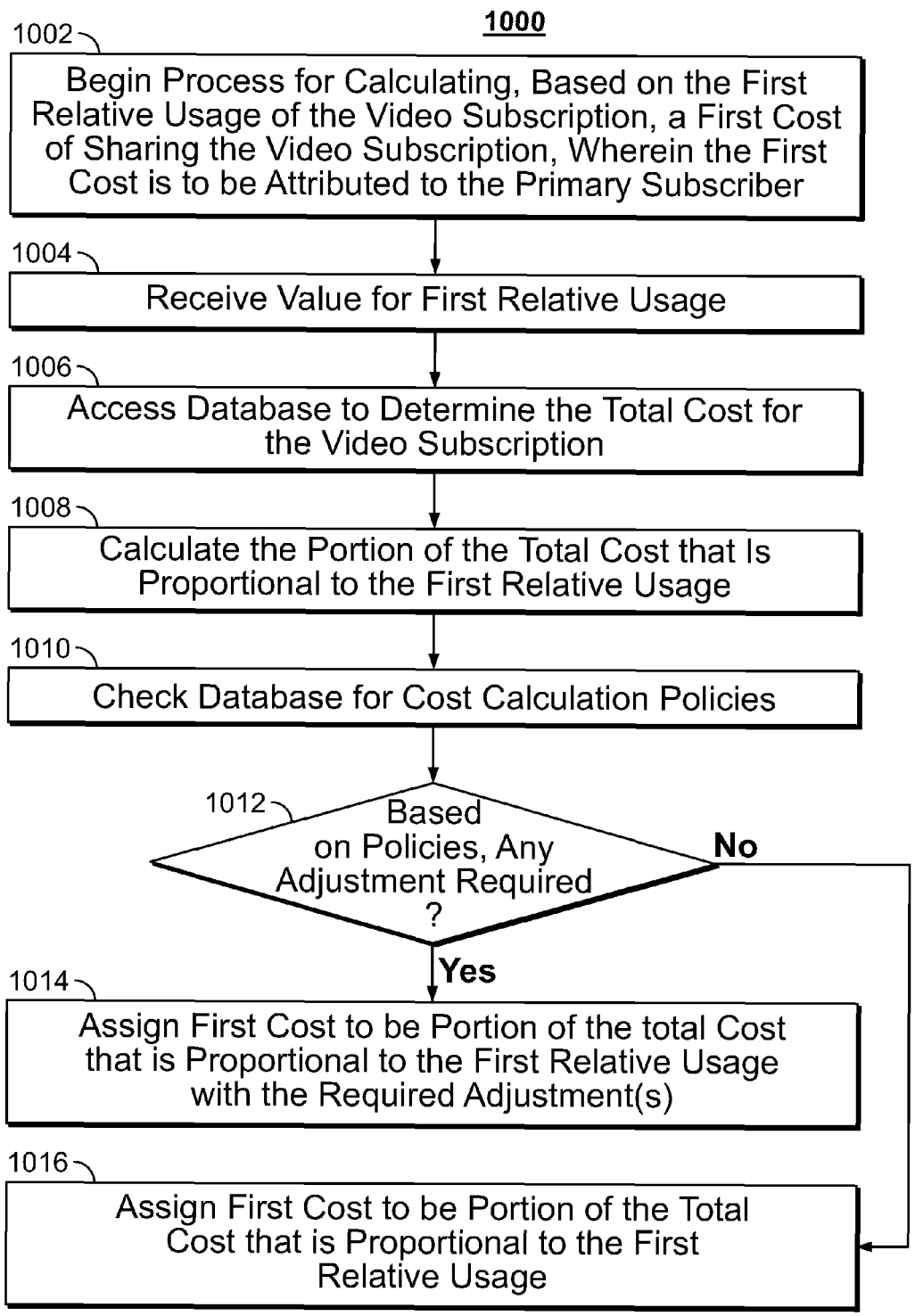
FIG. 10 is a flowchart of illustrative steps involved in calculating, based on the primary subscriber's relative usage of the video subscription, the cost of sharing the video subscription to the primary subscriber, in accordance with some embodiments of the disclosure.

FIG. 10 is a flowchart of illustrative steps involved in calculating, based on the primary subscriber's relative usage of the video subscription, the cost of sharing the video subscription to the primary subscriber, in accordance with some embodiments of the disclosure. It should be noted that process 1000 or any step thereof could be performed on, or provided by, any of the devices shown in FIGS. 3-5. For example, process 1000 may be executed by control circuitry 304 (FIG. 3) as instructed by control circuitry implemented on user equipment 402, 404, and/or 406 (FIG. 4) in order to calculate the cost of sharing the video subscription to the primary subscriber. In addition, one or more steps of process 600 may be incorporated into or combined with one or more steps of any other process or embodiment.

Process 1000 begins at 1002, where control circuitry 304 begins the process for calculating, based on the first relative usage of the video subscription, a first cost of sharing the video subscription, wherein the first cost is to be attributed to the primary subscriber. Control circuitry 304 may execute 1002 when 614 of process 600 begins.

Process 1000 may continue to 1004, where control circuitry 304 may receive a value for first relative usage. For example, following from the example above, first relative usage may be sixty percent. Process 1000 may continue to 1006, where control circuitry 304 may access a database (e.g., a database containing information about user A's account for the video consumption application) in storage 308 to determine the total cost of the video subscription for a pre-determined period. For example, the total cost for a month may be $10.

Process 1000 may continue to 1008, where control circuitry 304 may calculate the portion of the total cost that is proportional to the first relative usage. Manners in which control circuitry 304 may perform this calculation, discussed above and below, are applicable here. For example, control circuitry 304, based on the first relative usage of sixty percent, may assign first cost to be sixty percent as well. Process 1000 may continue to 1010, where control circuitry 304 may check a database (e.g., a database containing information about user A's account for the video consumption application) in storage 308 for cost calculation policies.

Process 1000 may continue to 1012, where control circuitry 304 may determine, based on policies, if there is any adjustment required to the cost calculated at 1008. If control circuitry 304 determines that there is adjustment(s) required to the cost calculated at 1008, process 1000 may continue to 1014 where control circuitry 304 may assign first cost to be a portion of the total cost that is proportional to the first relative usage with the required adjustment(s). For example, there may be a policy to add a $1 service fee to the cost of the primary subscriber. In this case, control circuitry 304 may calculate the cost of primary subscriber to be $7.

If control circuitry 304 determines that no adjustment is required to the cost calculated at 1008, control circuitry 304 may assign first cost to be a portion of the total cost that is proportional to the first relative usage. Manners in which control circuitry 304 may perform this assignment, discussed above and below, are applicable here.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 10.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present invention may be executed using processing circuitry. For instance, providing the secondary subscriber with access to the video subscription of the primary subscriber may be performed by processing circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 300, media content source 416, or media guidance data source 418. For example, an entry corresponding a type to a biometric measurement, as described herein, may be stored in, and retrieved from, storage 308 of FIG. 3, or media guidance data source 418 of FIG. 4. Furthermore, processing circuitry, or a computer program, may update settings associated with a user, such as a register of biometric devices in a vicinity of the user, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for a primary subscriber of a video subscription to share cost of the video subscription with a secondary subscriber, the method comprising:
   receiving a request from the primary subscriber to share access to the video subscription;
   in response to receiving the request from the primary subscriber, determining whether the primary subscriber is eligible to share access by comparing the access of the video subscription by the primary subscriber for a previous pre-determined period of time to a threshold;
   updating, based on the determining whether the primary subscriber is eligible to share access, an entry in a database to indicate that the video subscription is available for sharing;
   receiving a request from the secondary subscriber to share access to the video subscription;
   in response to receiving the request, providing the secondary subscriber with access to the video subscription;
   monitoring access of the video subscription by the primary subscriber and by the secondary subscriber;
   updating, based on the monitoring, a plurality of metrics corresponding to the access of the video subscription by the primary subscriber and by the secondary subscriber;
   determining, based on a metric of the plurality of metrics corresponding to the access of the video subscription by the primary subscriber and by the secondary subscriber, a first relative usage of the video subscription by the primary subscriber and a second relative usage of the video subscription by the secondary subscriber;
   calculating, based on the first relative usage of the video subscription, a first cost of sharing the video subscription, wherein the first cost is to be attributed to the primary subscriber; and
   calculating, based on the second relative usage of the video subscription, a second cost of sharing the video subscription, wherein the second cost is to be attributed to the secondary subscriber.

2. The method of claim 1, further comprising:
   identifying a subset of videos to which the secondary subscriber will not have access, wherein the subset is based on at least one of:
   popularity of video,
   release date of video,
   number of play backs allowed for video, and
   source of video.

3. The method of claim 1, further comprising, further in response to receiving the request from the primary subscriber:
   generating for display a plurality of selectable options corresponding to the plurality of metrics; and
   receiving from the primary subscriber a selection of a selectable option of the plurality of selectable options, wherein the determining of the first relative usage and the second relative usage is based on a metric of the plurality of metrics that corresponds to the selectable option.

4. The method of claim 1, further comprising:
   determining that a pre-determined period of time has elapsed from a time that the monitoring commenced;
   in response to determining that the pre-determined period of time has elapsed from the time that the monitoring commenced, initializing each metric of the plurality of metrics to a base value that preceded the updating.

5. The method of claim 1, wherein:
   monitoring the access of the video subscription by the primary subscriber and by the secondary subscriber comprises monitoring, for both the primary subscriber and the secondary subscriber, at least one of:
   time spent browsing the video subscription service,
   time spent playing back a video in the video subscription service,
   amount of videos in the video subscription service played back; and wherein
   updating, based on the monitoring, the plurality of metrics corresponding to the access of the video subscription by the primary subscriber and by the secondary subscriber comprises:
   storing the plurality of metrics corresponding to the access of the video subscription by the primary subscriber in a first data structure corresponding to the primary subscriber in a database, and
   storing the plurality of metrics corresponding to the access of the video subscription by the secondary subscriber in a second data structure corresponding to the secondary subscriber in the database.

6. The method of claim 5, wherein determining, based on the metric, the first relative usage of the video subscription by the primary subscriber and the second relative usage of the video subscription by the secondary subscriber comprises:
   selecting, for a pre-determined period of time, the metric from the plurality of metrics;
   accessing the first data structure to retrieve a first value of the metric corresponding to the access of the video subscription by the primary subscriber for the pre-determined period of time;

accessing the second data structure to retrieve a second value of the metric corresponding to the access of the video subscription by the secondary subscriber for the pre-determined period of time;

comparing the first value to the second value; and computing the first relative usage and the second relative usage of the video subscription based on the comparing.

7. The method of claim 6, wherein the pre-determined period of time corresponds to a billing cycle, and wherein the calculating recurs periodically based on the billing cycle.

8. A method for a primary subscriber of a video subscription to share cost of the video subscription with a secondary subscriber, the method comprising:

receiving a request from the secondary subscriber to share access to the video subscription;

in response to receiving the request, providing the secondary subscriber with access to the video subscription;

monitoring access of the video subscription by the primary subscriber and by the secondary subscriber;

updating, based on the monitoring, a plurality of metrics corresponding to the access of the video subscription by the primary subscriber and by the secondary subscriber;

determining, based on a metric of the plurality of metrics corresponding to the access of the video subscription by the primary subscriber and by the secondary subscriber, a first relative usage of the video subscription by the primary subscriber and a second relative usage of the video subscription by the secondary subscriber;

calculating, based on the first relative usage of the video subscription, a first cost of sharing the video subscription, wherein the first cost is to be attributed to the primary subscriber; and calculating, based on the second relative usage of the video subscription, a second cost of sharing the video subscription, wherein the second cost is to be attributed to the secondary subscriber and wherein calculating the first cost and the second cost of sharing the video subscription further comprises:

dividing a total cost of the video subscription between the first cost and the second cost such that the first cost is proportional to the first relative usage and the second cost is proportional second relative usage;

determining whether the second cost exceeds a threshold cost; and in response to determining that the second cost exceeds the threshold cost:

determining an additional amount by which the second cost exceeds the threshold cost;

assigning the second cost to be a value that is at least one of the threshold cost plus some margin wherein the margin does not exceed the additional amount and the threshold cost minus some margin;

assigning the first cost to be the total cost minus the second cost.

9. The method of claim 8, further comprising:

adding to at least one of the first cost and the second cost a service fee, wherein the service fee comprises at least one of:

a pre-determined percentage of the second cost, a pre-determined percentage of the first cost a pre-determined flat fee, and a pre-determined percentage of the total cost.

10. The method of claim 8, wherein:

updating, based on the monitoring, the plurality of metrics corresponding to the access of the video subscription by the primary subscriber and by the secondary subscriber comprises:

storing the plurality of metrics corresponding to the access of the video subscription by the primary subscriber in a first data structure corresponding to the primary subscriber in a database, and storing the plurality of metrics corresponding to the access of the video subscription by the secondary subscriber in a second data structure corresponding to the secondary subscriber in the database; and wherein determining, based on the metric, the first relative usage of the video subscription by the primary subscriber and the second relative usage of the video subscription by the secondary subscriber comprises:

selecting, for a pre-determined period of time, the metric from the plurality of metrics;

accessing the first data structure to retrieve a first value of the metric corresponding to the access of the video subscription by the primary subscriber for the pre-determined period of time;

accessing the second data structure to retrieve a second value of the metric corresponding to the access of the video subscription by the secondary subscriber for the pre-determined period of time;

comparing the first value to the second value; and computing the first relative usage and the second relative usage of the video subscription based on the comparing.

11. A system for a primary subscriber of a video subscription to share cost of the video subscription with a secondary subscriber, the system comprising:

communication circuitry and control circuitry configured to:

receive, using the communication circuitry, a request from the primary subscriber to share access to the video subscription;

in response to receiving the request from the primary subscriber, determine whether the primary subscriber is eligible to share access by comparing the access of the video subscription by the primary subscriber for a previous pre-determined period of time to a threshold;

update, based on the determining whether the primary subscriber is eligible to share access, an entry in a database to indicate that the video subscription is available for sharing;

receive, using the communication circuitry, a request from the secondary subscriber to share access to the video subscription;

in response to receiving the request, provide the secondary subscriber with access to the video subscription;

monitor access of the video subscription by the primary subscriber and by the secondary subscriber;

update, based on the monitoring, a plurality of metrics corresponding to the access of the video subscription by the primary subscriber and by the secondary subscriber;

determine, based on a metric of the plurality of metrics corresponding to the access of the video subscription by the primary subscriber and by the secondary subscriber, a first relative usage of the video subscription by the primary subscriber and a second relative usage of the video subscription by the secondary subscriber;

calculate, based on the first relative usage of the video subscription, a first cost of sharing the video subscription, wherein the first cost is to be attributed to the primary subscriber; and calculate, based on the second relative usage of the video subscription, a second cost of sharing the video subscription, wherein the second cost is to be attributed to the secondary subscriber.

12. The system of claim 11, wherein the control circuitry is further configured to:

identify a subset of videos to which the secondary subscriber will not have access, wherein the subset is determined based on at least one of:

popularity of video, release date of video, number of play backs allowed for video, and source of video.

13. The system of claim 11, wherein the control circuitry is further configured to, in response to receiving the request from the primary subscriber:

generate for display a plurality of selectable options corresponding to the plurality of metrics; and receive from the primary subscriber a selection of a selectable option of the plurality of selectable options, wherein the determining of the first relative usage and the second relative usage is based on a metric of the plurality of metrics that corresponds to the selectable option.

14. The system of claim 11, wherein the control circuitry is further configured to:

determine that a pre-determined period of time has elapsed from a time that the monitoring commenced;

in response to determining that the pre-determined period of time has elapsed from the time that the monitoring commenced, initialize each metric of the plurality of metrics to a base value that preceded the updating.

15. The system of claim 11, wherein the control circuitry is further configured, when monitoring the access of the video subscription by the primary subscriber and by the secondary subscriber, to monitor for both the primary subscriber and the secondary subscriber, at least one of:

time spent browsing the video subscription service, time spent playing back a video in the video subscription service, amount of videos in the video subscription service played back; and wherein the control circuitry is further configured, when updating, based on the monitoring, the plurality of metrics corresponding to the access of the video subscription by the primary subscriber and by the secondary subscriber comprises storage circuitry, to:

store the plurality of metrics corresponding to the access of the video subscription by the primary subscriber in a first data structure corresponding to the primary subscriber in a database, and store the plurality of metrics corresponding to the access of the video subscription by the secondary subscriber in a second data structure corresponding to the secondary subscriber in the database.

16. The system of claim 15, wherein the control circuitry is further configured, when determining, based on the metric, the first relative usage of the video subscription by the primary subscriber and the second relative usage of the video subscription by the secondary subscriber, to:

select, for a pre-determined period of time, the metric from the plurality of metrics;

access the first data structure to retrieve a first value of the metric corresponding to the access of the video subscription by the primary subscriber for the pre-determined period of time;

access the second data structure to retrieve a second value of the metric corresponding to the access of the video subscription by the secondary subscriber for the pre-determined period of time;

compare the first value to the second value; and compute the first relative usage and the second relative usage of the video subscription based on the comparing.

17. The system of claim 16, wherein the control circuitry is further configured to recognize the pre-determined period of time corresponds to a billing cycle, and wherein the control circuitry is further configured to calculate periodically based on the billing cycle.

18. A system for a primary subscriber of a video subscription to share cost of the video subscription with a secondary subscriber, the system comprising:

communication circuitry and control circuitry configured to:

receive, using the communication circuitry, a request from the secondary subscriber to share access to the video subscription;

in response to receiving the request, provide the secondary subscriber with access to the video subscription;

monitor access of the video subscription by the primary subscriber and by the secondary subscriber;

update, based on the monitoring, a plurality of metrics corresponding to the access of the video subscription by the primary subscriber and by the secondary subscriber;

determine, based on a metric of the plurality of metrics corresponding to the access of the video subscription by the primary subscriber and by the secondary subscriber, a first relative usage of the video subscription by the primary subscriber and a second relative usage of the video subscription by the secondary subscriber;

calculate, based on the first relative usage of the video subscription, a first cost of sharing the video subscription, wherein the first cost is to be attributed to the primary subscriber; and calculate, based on the second relative usage of the video subscription, a second cost of sharing the video subscription, wherein the second cost is to be attributed to the secondary subscriber and wherein the control circuitry is further configured, when calculating the first cost and the second cost of sharing the video subscription, to:

divide a total cost of the video subscription between the first cost and the second cost such that the first cost is proportional to the first relative usage and the second cost is proportional second relative usage;

determine whether the second cost exceeds a threshold cost; and in response to determining that the second cost exceeds the threshold cost:

determine an additional amount by which the second cost exceeds the threshold cost;

assign the second cost to be a value that is at least one of the threshold cost plus some margin wherein the margin does not exceed the additional amount and the threshold cost minus some margin;

assign the first cost to be the total cost minus the second cost.

19. The system of claim 18, wherein the control circuitry is further configured to:

add to at least one of the first cost and the second cost a service fee, wherein the service fee comprises at least one of:

a pre-determined percentage of the second cost, a pre-determined percentage of the first, cost a pre-determined flat fee, and a pre-determined percentage of the total cost.

20. The system of claim 18, wherein the control circuitry is further configured, when updating, based on the monitoring, the plurality of metrics corresponding to the access of the video subscription by the primary subscriber and by the secondary subscriber comprises storage circuitry, to:

store the plurality of metrics corresponding to the access of the video subscription by the primary subscriber in a first data structure corresponding to the primary subscriber in a database, and store the plurality of metrics corresponding to the access of the video subscription by the secondary subscriber in a second data structure corresponding to the secondary subscriber in the database; and wherein the control circuitry is further configured, when determining, based on the metric, the first relative usage of the video subscription by the primary subscriber and the second relative usage of the video subscription by the secondary subscriber, to:

select, for a pre-determined period of time, the metric from the plurality of metrics;

access the first data structure to retrieve a first value of the metric corresponding to the access of the video subscription by the primary subscriber for the pre-determined period of time;

access the second data structure to retrieve a second value of the metric corresponding to the access of the video subscription by the secondary subscriber for the pre-determined period of time;

compare the first value to the second value; and compute the first relative usage and the second relative usage of the video subscription based on the comparing.

* * * * *